(12) United States Patent
Street et al.

(10) Patent No.: US 6,564,924 B2
(45) Date of Patent: May 20, 2003

(54) APPARATUS AND METHOD FOR POSITIONING RANDOMLY ORIENTED ARTICLES IN THE SAME ORIENTATION

(76) Inventors: Bryan Street, 3853 Harshbarger, Jackson, MI (US) 49203; Dale R. Westrick, 9041 Herbison Rd., Grand Ledge, MI (US) 48837

( * ) Notice: Subject to any disclaimer, the term of this patent is extended or adjusted under 35 U.S.C. 154(b) by 15 days.

(21) Appl. No.: 09/900,939

(22) Filed: Jul. 9, 2001

(65) Prior Publication Data

US 2003/0006122 A1 Jan. 9, 2003

(51) Int. Cl.$^7$ .............................................. B65G 47/24
(52) U.S. Cl. ...................... 198/400; 198/380; 406/79; 221/278
(58) Field of Search ................................. 198/400, 380, 198/438; 406/79, 81, 82, 147, 151, 142, 143, 146; 221/278

(56) References Cited

U.S. PATENT DOCUMENTS

| | | | | |
|---|---|---|---|---|
| 2,712,910 A | * | 7/1955 | Goerlich | 243/16 |
| 2,797,057 A | * | 6/1957 | Sindzinski et al. | 243/16 |
| 3,042,454 A | * | 7/1962 | Eissmann et al. | 302/2 |
| 3,351,388 A | | 11/1967 | Frank | |
| 3,392,815 A | * | 7/1968 | Skeels et al. | 198/33 |

(List continued on next page.)

Primary Examiner—Christopher P. Ellis
Assistant Examiner—Rashmi Sharma
(74) Attorney, Agent, or Firm—Young & Basile, P.C.

(57) ABSTRACT

An apparatus is disclosed for positioning randomly oriented, asymmetrically-shaped articles in the same orientation, the apparatus comprising at least first and second oppositely arranged conduits dimensioned to receive the articles therein. Each conduit has an inlet end, and the inlet ends of the at least first and second conduits are spaced-apart to define an opening therebetween for receiving therein, one at a time, a plurality of asymmetrically-shaped articles that are randomly oriented in at least first and second orientations. Suction is created in both of the conduits, the suction being sufficient to selectively draw articles oriented in the first orientation from the opening into the inlet end of the at least first conduit, and sufficient to draw articles oriented in the second orientation from the opening into the inlet end of the at least second conduit, such that articles in the at least first and second conduits are all identically oriented relative to a path of travel through the conduits. The specification further discloses a method for positioning randomly oriented, asymmetrically-shaped articles in the same orientation, the method comprising the steps of: Providing at least first and second oppositely arranged conduits dimensioned to receive the articles therein, each conduit having an inlet end, and the inlet ends of the at least first and second conduits being spaced-apart to define an opening between the conduit inlets for receiving therein, one at a time, a plurality of asymmetrically-shaped articles that are randomly oriented in at least first and second orientations; presenting, one at a time, a plurality of asymmetrically-shaped articles that are randomly oriented in first and second orientations at the opening between the conduit inlets; and creating in both of the at least first and second conduits suction that is sufficient to selectively draw articles oriented in the first orientation from the opening into the inlet end of the at least first conduit, and sufficient to draw articles oriented in the second orientation from the opening into the inlet end of the at least second conduit, such that articles in the at least first and second conduits are all identically oriented relative to a path of travel through the conduits.

17 Claims, 3 Drawing Sheets

U.S. PATENT DOCUMENTS

| | | | |
|---|---|---|---|
| 3,502,195 A | * 3/1970 | Benner | 198/33 |
| 3,556,282 A | 1/1971 | Moeltzner | |
| 3,591,047 A | * 7/1971 | Buhle | 221/211 |
| 3,690,437 A | * 9/1972 | Kammann | 198/33 AA |
| 3,776,346 A | 12/1973 | Dubuit | |
| 3,797,640 A | 3/1974 | Aidlin et al. | |
| 3,869,042 A | * 3/1975 | Floyd | 198/267 |
| 3,945,682 A | * 3/1976 | Hoagland et al. | 302/12 |
| 3,977,160 A | * 8/1976 | Klug et al. | 53/240 |
| 3,998,320 A | 12/1976 | Eggert | |
| 4,091,600 A | * 5/1978 | Itoh | 53/282 |
| 4,104,966 A | * 8/1978 | Ackley, Jr. et al. | 101/40 |
| 4,181,241 A | * 1/1980 | Currah | 221/211 |
| 4,219,110 A | * 8/1980 | Ubukata | 198/380 |
| 4,288,074 A | * 9/1981 | Kainz | 273/29 A |
| 4,343,575 A | * 8/1982 | Kimball | 406/19 |
| 4,356,907 A | 11/1982 | Aidlin et al. | |
| 4,358,226 A | * 11/1982 | Nagata et al. | 406/82 |
| 4,720,215 A | * 1/1988 | Arena | 406/105 |
| 4,736,831 A | * 4/1988 | Fileds | 198/395 |
| 4,782,939 A | * 11/1988 | Fileds | 198/395 |
| 4,915,547 A | * 4/1990 | Cahill et al. | 406/87 |
| 4,995,765 A | * 2/1991 | Tokuhiro | 406/117 |
| 5,217,329 A | * 6/1993 | Lang | 406/176 |
| 5,343,997 A | * 9/1994 | Maerkedahl | 198/392 |
| 5,385,434 A | * 1/1995 | Quinn et al. | 406/73 |
| 5,503,515 A | * 4/1996 | Moorehead | 414/755 |
| 5,513,739 A | * 5/1996 | Berg | 198/380 |
| 5,735,382 A | * 4/1998 | Jung | 198/399 |
| 5,836,477 A | * 11/1998 | Yeh | 221/135 |
| 6,334,547 B1 | * 2/2002 | Hodges | 221/278 |

* cited by examiner

APPARATUS AND METHOD FOR POSITIONING RANDOMLY ORIENTED ARTICLES IN THE SAME ORIENTATION

FIELD OF THE INVENTION

The present invention relates to apparatus for positioning a plurality of randomly oriented articles in the same orientation, and more particularly to such an apparatus having oppositely arranged conduits, the conduits generating therein suction sufficient to selectively draw articles oriented in a first orientation into one of the conduits, and sufficient to draw articles oriented in a second orientation into the other of the conduits, such that articles in the conduits are all identically oriented relative to a path of travel through the conduits.

BACKGROUND OF THE INVENTION

Properly orienting articles of manufacture, for instance in automated production applications, is of first importance to efficient and effective production. For example, in a bottle filling assembly line, empty bottles randomly oriented at one location in the assembly line must all be positioned in a particular orientation prior to arriving at a downstream filling station, so that the filling equipment properly interfaces with the mouth of each bottle. Similar needs for proper article orientation attend other production applications, for instance where articles must be packaged all in a particular orientation. Moreover, it is often necessary in automated production applications involving articles of manufacture to provide means for accumulating articles between workstations in a production line, such as, for instance, when a downstream workstation breaks down or otherwise suffers a decrease in productivity. When the downstream workstation is operating normally again, the accumulated articles must then be reintroduced to the production line as efficiently as possible. Where the articles become randomly oriented in the accumulating station, they must necessarily be properly reoriented upon reintroduction to the production line.

Known apparatus for positioning randomly oriented articles in the same orientation, so-called "descrambling" or "unscrambling" apparatus, have included complicated mechanical devices that physically interact with the randomly-oriented articles in order to re-orient them accordingly. The unscrambling and orienting apparatus of Skeels et al., U.S. Pat. No. 3,392,815, is exemplary in these regards. Such apparatus can be expensive, difficult to maintain due to their mechanical complexity, and must be adapted to the shape of each particular article of manufacture in order to ensure proper operation. These limitations may necessitate multiple production lines, each dedicated to a single article of manufacture, and may further limit productivity. Moreover, mechanical descrambling apparatus tend to scratch and mar the surface of the articles being descrambled. In some circumstances, for instance the descrambling of plastic beverage bottles, such damage to the surface of the bottles is commercially undesirable as the bottles are rendered aesthetically unattractive.

It would therefore be desirable to provide an improved method and apparatus for positioning randomly oriented articles in the same orientation, that is at once economical and efficient, facilitates increased production output, minimizes or eliminates scratching of articles, and which overcomes the disadvantages associated with prior-art apparatus of the same type.

SUMMARY OF THE DISCLOSURE

The present invention addresses and solves the problems discussed above, and encompasses other features and advantages, by providing an apparatus for positioning randomly oriented, asymmetrically-shaped articles in the same orientation, the apparatus comprising: At least first and second oppositely arranged conduits dimensioned to receive the articles therein, each conduit having an inlet end, and the inlet ends of the at least first and second conduits being spaced-apart to define an opening therebetween for receiving, one at a time, a plurality of asymmetrically-shaped articles that are randomly oriented in at least first and second orientations; and means for creating suction in both of the at least first and second conduits that is sufficient to selectively draw articles oriented in the first orientation from the opening into the inlet end of the at least first conduit, and that is sufficient to draw articles oriented in the second orientation from the opening into the inlet end of the at least second conduit, such that articles in the at least first and second conduits are all identically oriented relative to a path of travel through the conduits.

According to one feature of this invention, the apparatus further comprises means for presenting at the opening between the inlet ends of the at least first and second conduits a plurality of asymmetrically-shaped articles that are randomly oriented in at least first and second orientations.

According to another feature of this invention, the apparatus further comprises means for receiving articles from the at least first and second conduits for transfer to at least one remote location. Such means may comprise, for instance, at least one conveyor arranged proximate an outlet end of each of the at least first and second conduits, each conveyor adapted to receive articles from one of the at least first and second conduits for transfer to at least one remote location. Other such means may comprise, by way of non-limiting example, pneumatic or vacuum transfer conduits, movable pallets, manual transfer, etc.

In one embodiment of this invention, the apparatus comprises at least first and second spaced-apart conduits dimensioned to receive the articles therein, one at a time, each conduit having an inlet end, the inlet ends of the at least first and second conduits being arranged directly oppositely on a conveyor adapted to convey to an opening between the inlet ends of the at least first and second conduits a plurality of asymmetrically-shaped articles that are randomly, oppositely oriented in at least first and second orientations on the conveyor; and means for creating suction in each of the at least first and second conduits that is sufficient to draw articles oriented in the first orientation from the conveyor into the inlet end of the at least first conduit, and that is sufficient to draw articles oriented in the second orientation from the conveyor into the inlet end of the at least second conduit, such that articles emerging from the outlet ends of both conduits are all identically oriented.

Per one feature of this invention, means are provided for recycling through the conveyor articles not previously drawn into one of the at least first and second conduits. According to this feature, the conveyor comprises first and second ends, the first end of the conveyor being adapted to receive thereon articles to be conveyed to the at least first and second conduits, and the second end of the conveyor being arranged downstream of the conduits, and the apparatus further comprises a return chute adapted to receive articles from the second end of the conveyor that are not drawn into one of the at least first and second conduits, a receptacle communicating with the return chute and dimensioned to receive therein articles from the return chute, a feed tube having a first end communicating with the receptacle and a second end positioned proximate the first end of the conveyor, and a blower adapted to generate a positive air pressure sufficient to convey through the feed tube any articles transferred to the receptacle via the return chute.

The present invention also provides a method for positioning randomly oriented, asymmetrically-shaped articles in the same orientation, the method comprising the steps of: Providing at least first and second oppositely arranged conduits dimensioned to receive the articles therein, each conduit having an inlet end, and the inlet ends of the at least first and second conduits being spaced-apart to define an opening between the conduit inlets for receiving therein, one at a time, a plurality of asymmetrically-shaped articles that are randomly oriented in at least first and second orientations;

presenting, one at a time, a plurality of asymmetrically-shaped articles that are randomly oriented in first and second orientations at the opening between the conduit inlets; and creating in both of the at least first and second conduits suction that is sufficient to selectively draw articles oriented in the first orientation from the opening into the inlet end of the at least first conduit, and sufficient to draw articles oriented in the second orientation from the opening into the inlet end of the at least second conduit, such that articles in the at least first and second conduits are all identically oriented relative to a path of travel through the conduits.

According to one feature, this inventive method further comprises the step of transferring articles from the at least first and second conduits to at least one remote location.

Per another feature of this invention, the method comprises the further step of recycling and subsequently presenting at the at least first and second conduits any of the plurality of articles not previously drawn into one of said at least first and second conduits.

According to one embodiment of this invention, the method comprises the steps of: Providing at least first and second directly oppositely arranged conduits dimensioned to receive the articles therein, each conduit having an inlet end, and the inlet ends of the at least first and second conduits being spaced-apart to define an opening between the conduit inlets for receiving, one at a time, a plurality of asymmetrically-shaped articles that are randomly oriented in at least first and second orientations;

conveying a plurality of asymmetrically-shaped articles that are randomly oriented in first and second orientations in a first direction of travel to the opening defined between the inlet ends of the conduits; and creating in both of the at least first and second conduits suction that is sufficient to selectively draw articles oriented in the first orientation from the opening into the inlet end of the at least first conduit, and that is sufficient to draw articles oriented in the second orientation from the opening into the inlet end of the at least second conduit, such that articles in the at least first and second conduits are all identically oriented relative to a path of travel through the conduits.

These and other features and advantages of the present invention win become apparent to those skilled in the art upon reference to the following description and drawings.

BRIEF DESCRIPTION OF THE DRAWINGS

The description herein makes reference to the accompanying drawings, wherein like reference numerals refer to like parts throughout the several views, and wherein.

DESCRIPTION OF THE ILLUSTRATED EMBODIMENT

Figure 1:
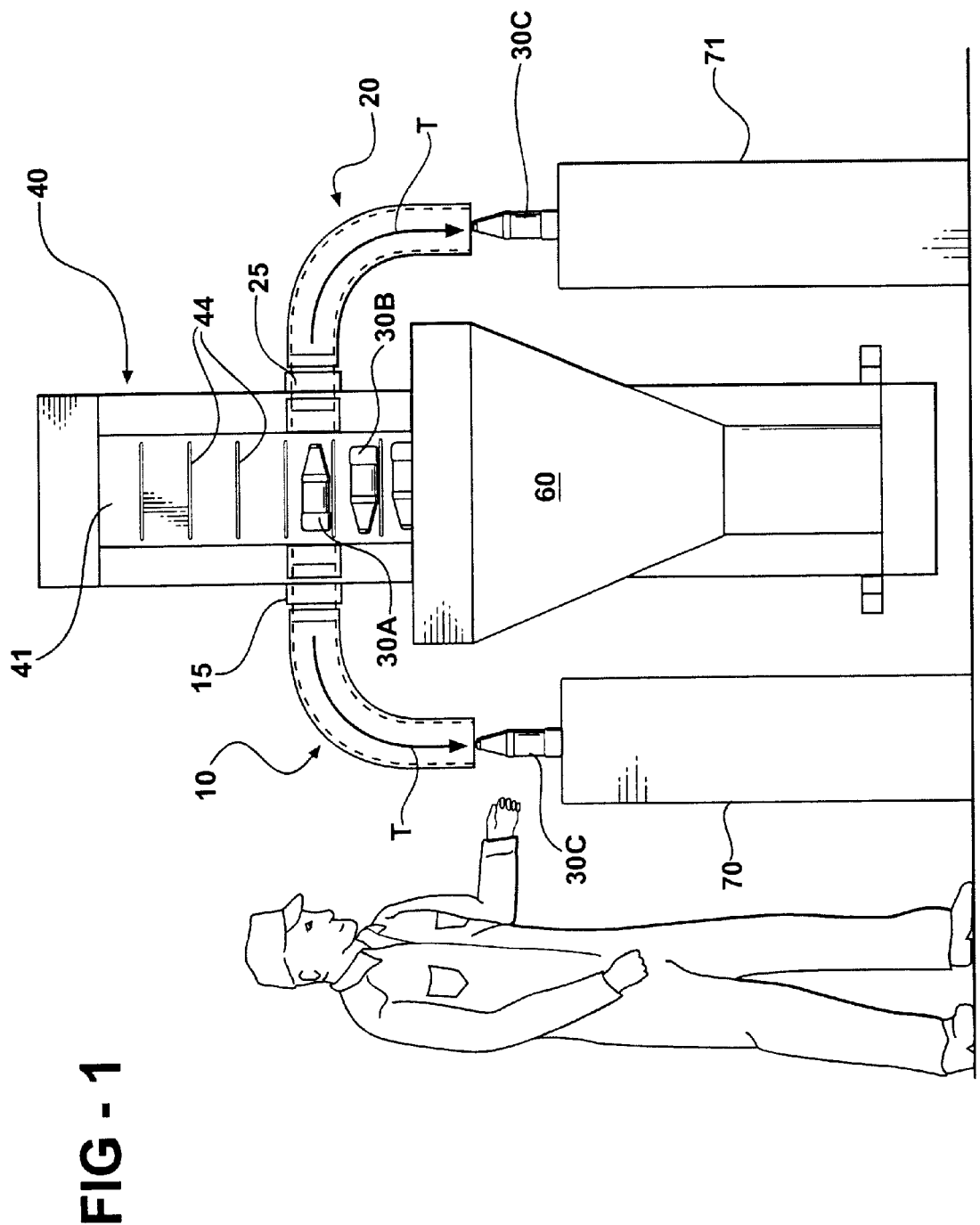
FIG. 1 is an elevational view showing the descrambling apparatus of the present invention, the apparatus being shown associated with a conveyor and hopper according to one possible operational environment.

Referring now to the drawings, and more specifically to FIG. 1, the present invention will be seen to generally comprise an apparatus for positioning randomly oriented, asymmetrically-shaped articles in the same orientation, the apparatus including at least first 10 and second 20 oppositely arranged conduits dimensioned to receive the articles therein, the conduits being spaced-apart to define an opening therebetween for receiving therein, one at a time, a plurality of asymmetrically-shaped articles, for example the illustrated bottles 30, that are randomly oriented in first 30A and second 30B orientations, and means for creating in both of the at least first 10 and second 20 conduits suction sufficient to selectively draw articles oriented in the first orientation 30A from the opening into the at least first conduit 10, and sufficient to draw articles oriented in the second orientation 30B from the opening into the at least second conduit 20, such that articles in the at least first and second conduits are all identically oriented relative to a path of travel T through the conduits.

As used herein, the term "asymmetrically-shaped articles" means and refers to articles, including, without limitation, articles of manufacture such as bottles, cans, etc., characterized by dissimilar shapes defined on opposite sides of a transverse plane bisecting the articles longitudinally, such that the articles may be selectively drawn by sufficient suction into one of at least two oppositely arranged conduits, all as explained in greater detail hereinbelow. By way of example, the bottles referred to herein in describing the operation of the present invention in one possible environment are "asymmetrically-shaped" in that each bottle is characterized by a cylindrical bottom half that tapers to a narrower, frusto-conically-shaped mouth in the upper half, all as best shown in FIG. 1. However, it will be understood with reference to the remainder of this disclosure that this invention has application beyond descrambling bottles such as shown in the exemplary operational environment.

The term "descrambling" is used herein as shorthand reference to the act of positioning randomly oriented, asymmetrically-shaped articles in the same orientation, while the term "descrambled" refers to the condition of such previously randomly oriented articles being positioned in the same orientation. The term "descrambler", as used herein, means and refers to an apparatus that is operative to position randomly oriented, asymmetrically-shaped articles in the same orientation.

As used herein, the term "suction" refers to the act or process of drawing something into a space by means of at least partially exhausting the air in the space.

Figure 3:
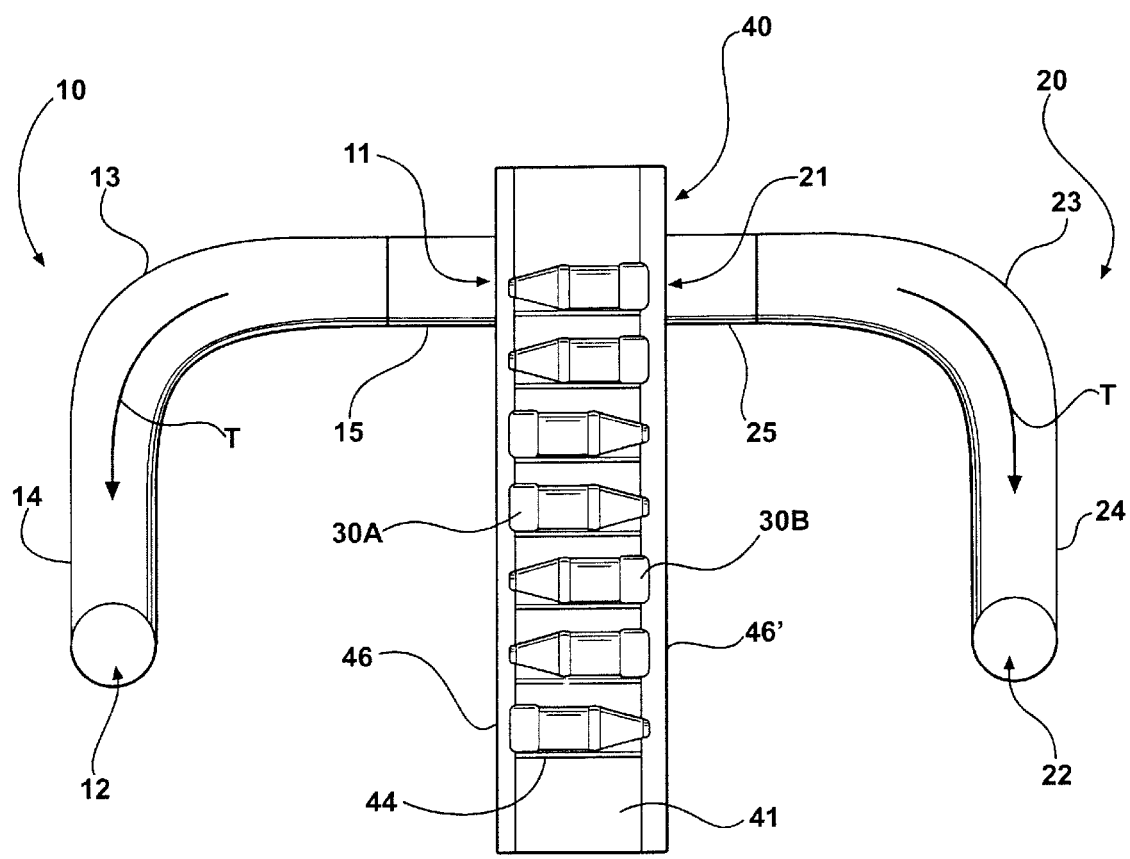
FIG. 3 is an overhead view of the descrambling apparatus of FIG. 1.

Referring next to FIGS. 1 and 3, the invention is shown and described in an operational environment wherein the apparatus is associated with a conveyor 40 operative to convey to an opening between the inlet ends of the conduits 10, 20 the articles to be descrambled. It will be understood however, that the present invention need not be associated with a conveyor of the type shown and described; rather, the apparatus of this invention may be employed in myriad environments using numerous means to present at the conduit inlets the articles to be descrambled. Such other means may include, for example, gravity fed conduits, pneumatic or vacuum conduits, etc.

The conduits 10, 20 of the illustrated embodiment each include both an inlet end (11 and 21, respectively) and an outlet end (12 and 22, respectively), the inlet end of each conduit being positioned, in the illustrated operational environment, adjacent the conveyor 40, and most preferably mounted thereon, so as to selectively remove the randomly oriented articles from the conveyor in the manner described below. As shown, the conduits 10, 20 are directly oppositely arranged on the conveyor 40, and this is the presently most preferred arrangement. However, it will be understood that "oppositely arranged," as that term is used herein, contemplates arrangements of the conduits other than directly opposite. Most preferably, the opening defined between the conduits inlets 11, 21, in this case defined by the width of the conveyor, is dimensioned to receive therein, one at a time, the articles to be descrambled.

It is also preferred that the opening, while large enough to accommodate each article to be descrambled, is not so great that, in view of such considerations as the strength of suction, the articles to be descrambled are not selectively drawn into the respective conduit inlets in the manner described herein.

The conduits 10, 20 are dimensioned to receive therein, one at a time, the articles to be descrambled. As will be understood from the remainder of this disclosure, the dimension of each conduit should be at least large enough to accommodate the article being descrambled, without being so large in diameter that, in view of such considerations as the distance from the conduit inlet to the article and the strength of the suction, articles are not selectively drawn into the respective conduits in the manner described.

Each conduit 10, 20 preferably, but not necessarily, comprises a suitable length of tubing, such as flexible hose or the like, so as to be adaptable to a desired shape for conveying descrambled articles to further, remote locations, such as a further workstation, etc.

Each conduit 10, 20 also includes means for creating suction therein that is sufficient to selectively draw articles oriented in the first orientation from the opening between the conduits and into the inlet end of the at least first conduit, and sufficient to draw articles oriented in the second orientation from the opening between the conduits and into the inlet end of the at least second conduit, such that articles in the at least first and second conduits are all identically oriented relative to a path of travel T through the conduits. Most preferably, the suction force created in each conduit 10, 20 is substantially equal, so that all of the articles are not drawn to the same conduit. In the illustrated embodiment, these suction creating means comprise vacuums 15, 25, one such vacuum operatively connected to a conduit 10 or 20 downstream of the respective inlet end and operable to create in each conduit suction sufficient to selectively draw articles into the inlet ends 11, 21 of the conduits 10, 20 in the manner described in more detail elsewhere herein. Suitable vacuums are commercially available from Exair Corporation, such as the Exair Aluminum Line Vac models. The illustrated suction creating means are shown as being in-line with the conduits 10, 20. However, other means for generating the requisite suction in each of the conduits 10, 20 are also envisioned, including blowers (not shown) associated with each conduit at some point along their respective lengths, and operative to create the requisite suction at the conduit inlet ends by generating a positive air pressure further downstream, and so drawing more air into the upstream, inlet end of the conduit. And although a pair of vacuums 15, 25 are shown in the illustrated embodiment, one associated with each of the conduits 10, 20, the requisite suction in each conduit may likewise be created by a common vacuum, blower, or other suitable means.

Figure 2:
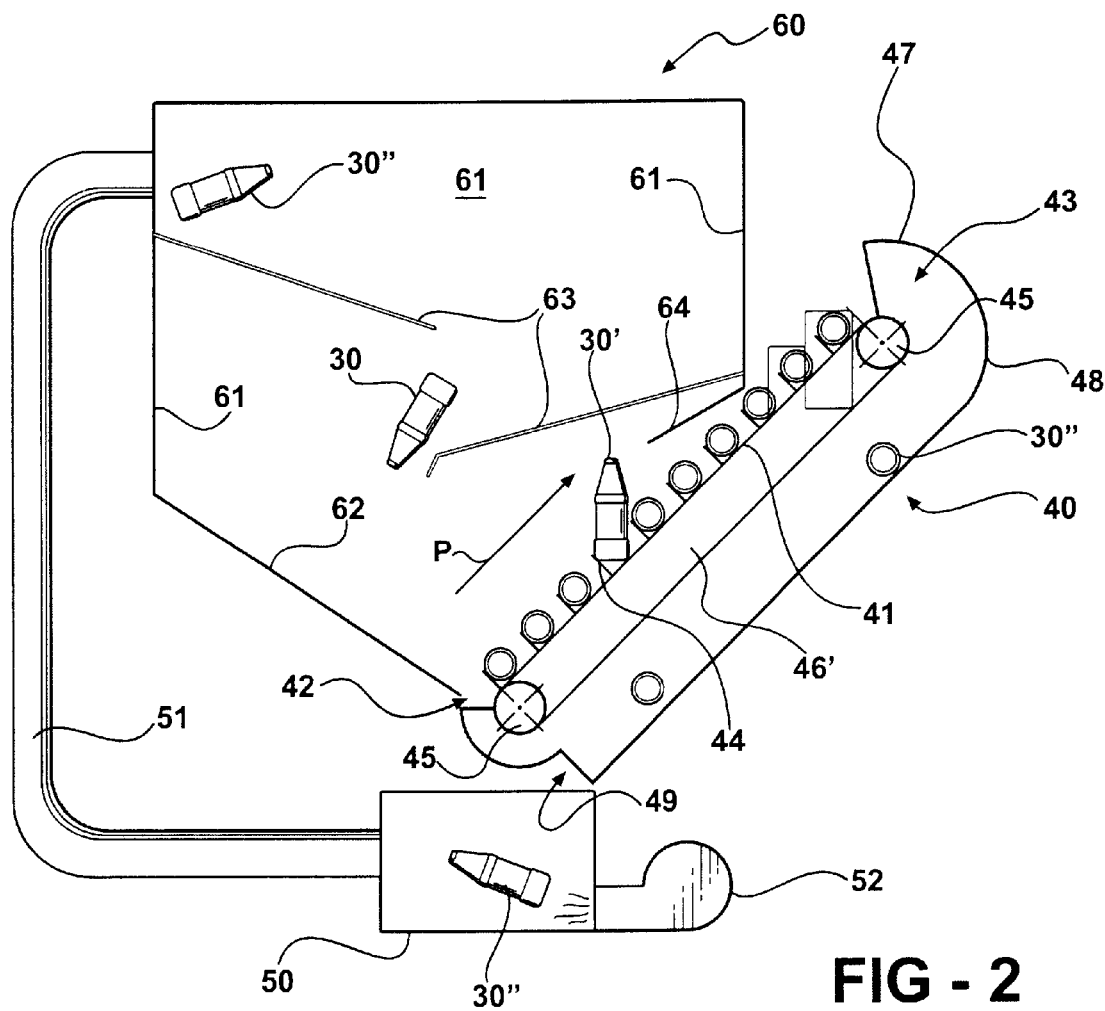
FIG. 2 is a simplified side view of the descrambling apparatus of the present invention, further illustrating means for recycling any articles not previously drawn into one of the at least two conduits.

Referring now to FIGS. 2 and 3, a plurality of asymmetrically-shaped articles are sequentially presented at the opening between the at least first 10 and second 20 conduits. Without limitation, the presentation of articles at the conduits may be made by conveyor 40, the conveyor operative to continuously convey articles from a first location to the conduits 10, 20 for descrambling. The conveyor 40 as shown most preferably comprises an endless belt 41, the belt 41 being provided with means to capture and convey articles thereon along a path of travel P between first 42 and second 43 ends of the conveyor. Though not intended to be limiting, the belt 41 most preferably includes a plurality of equidistantly spaced scoop-cleats 44 each having a length, depth and angular orientation relative to the belt 41 suited to receive and lift articles, one at a time, from a hopper 60 positioned proximate the conveyor 40. The hopper 60 forms no part of this invention but may be employed as desired in numerous operational environments, including such as shown and described herein. According to convention, the endless belt 41 of the conveyor 40 is driven in the desired path of travel P by a pair of motor-driven rollers 45 positioned at opposite ends of the conveyor 40 and mounted between opposing sides 46, 46'. A belt conveyor of the type described is commercially available from EMI Corp. Plastics Equipment, Model RMSC.

It will of course be understood that the descrambling apparatus of this invention may be employed in numerous operational environments, and so any number of conventional means may be employed to sequentially present at the opening between the at least first 10 and second 20 conduits a plurality of asymmetrically-shaped articles, including other types of conveyors operative to transfer articles to the conduits 10, 20, such as, without limitation, roller-type conveyors, overhead conveyors, etc. Alternatively, the articles may be presented at the conduits 10, 20 by vacuum transfer, pneumatic transfer, manually, etc., all depending upon the particular environment in which the descrambling apparatus of this invention is adapted.

Referring specifically to FIG. 2, an embodiment of the present invention is shown to include means for recycling through the conveyor any of the plurality of articles not previously drawn into one of the at least first 10 and second 20 conduits. As shown, such means more particularly include a return shroud 47 provided at the second end 43 of the conveyor 40, the return shroud 47 defining the inlet end of a gravity-feed, return chute 48 disposed on the underside of and extending the length of the conveyor 40. The return chute 48 has an outlet end 49 defined proximate the first end 42 of the conveyor 40, the outlet end 49 communicating with a receptacle 50 dimensioned to receive therein a number of articles transferred through the return chute 48 (i.e., articles that are not drawn off of the conveyor by vacuum into the conduits 10, 20). The receptacle 50 communicates with a feed chute 51 terminating at an upper, inlet end of the hopper 60. A blower 52 operatively associated with the receptacle 50 communicates with the receptacle 50 and feed chute 51 a positive air pressure sufficient to convey to the hopper 60 through the feed chute 51 any articles transferred to the receptacle 50 via the return chute 48.

Referring now to FIGS. 1 through 3, operation of the present invention will be more fully explained in conjunction with the exemplary application of descrambling plastic bottles in a bottle filling assembly line employing a conveyor and a hopper, all as described herein. It will of course be understood that this is only an exemplary application, and is not intended to be limiting the of the present invention.

At the outset, a plurality of asymmetrically-shaped bottles 30 are dispensed into the hopper 60 by any desired means. The hopper 60 as shown includes side walls 61 and an inclined bottom 62 sloping downwardly towards the first end 42 of the conveyor 40 to facilitate gravity-feed of articles towards the conveyor 40. The interior of the hopper 60 is further divided with inclined baffles 63 sloping downwardly towards the center of the hopper 60 in order to facilitate the transfer of articles to the conveyor 40. A further inclined baffle 64 is positioned proximate the conveyor in order to prevent the transfer of improperly oriented articles along the conveyor, as described hereinbelow.

The bottles 30 are urged by gravity down the inclined baffles 63, down the inclined bottom 62, and so on to the scoop-cleats 44 of the continuously moving conveyor belt 41. The bottles 30 ideally come to rest on their sides in the scoop cleats 44, and are randomly arranged in one of two opposite orientations; a first orientation 30A, according to which the bottles are all facing the same side 46 of the conveyor, and a second orientation 30B according to which the bottles are all facing the opposite side 46' of the conveyor 40. Those bottles not so oriented (e.g., those that are captured on the scoop-cleats in a vertical orientation), such as the bottle 30' shown in FIG. 2, are directed backwardly to the bottom of the hopper 60 upon impact with the inclined baffle 64.

As the randomly oriented bottles 30A, 30B move in front of the opposing inlet ends 11, 21 of the conduits 10, 20, respectively, bottles oriented in a first direction 30A are selectively drawn off, one at a time, of the moving belt 41 by the suction created in the conduit 10 having its inlet end 11 proximate the bottom surface of these bottles 30A, while those bottles oriented in a second direction 30B are selectively drawn off, one at a time, of the moving belt 41 by the suction created in the other conduit 20, the inlet end 21 of which is proximate the bottom surface of these bottles 30B.

Both in the case of the illustrated embodiment and in other operational environments to which the descrambling apparatus of this invention is adapted, the articles (e.g., the bottles 30) are presented substantially equidistant from the opposing inlets 11, 21, so that the suction from the conduits is approximately equally exerted on each article.

Referring again to FIGS. 1 and 3, means may be provided for receiving articles from the at least first and second conduits for transfer to at least one remote location. In the illustrated embodiment, the outlet ends 12, 22 of each conduit 10, 20, respectively, preferably terminate proximate further conveyors 70, 71, which may be arranged to direct the descrambled articles to further workstations for additional processing, for instance filling and labeling in the exemplary case of bottles, as shown. As depicted, each conduit 10, 20 includes a radiused portion 13, 23 which transitions to a downwardly extending portion 14, 24 proximate the outlet ends 12, 22, such that the articles conveyed therethrough emerge in a desired orientation. In the case of the illustrated example, particularly, the bottles 30 are dispensed onto the conveyors 70, 71 in an upright orientation 30C (FIG. 1). Of course, the conveyors 70, 71 may be employed as desired, or not at all, depending upon the operational environment wherein the present invention is being employed. It will also be understood by those skilled in the art that, as desired, other means may be employed to transfer articles from the conduits to further locations. For instance, both conduits 10, 20 could merge into a single conduit (not shown) adapted to transfer, for instance by vacuum or pneumatic pressure, the descrambled articles to further workstations for additional processing.

The bottles drawn off by each conduit 10, 20 are transferred, one at a time, by both gravity and the momentum imparted by the suction generated by the respective vacuums 15, 25, along a path of travel T through the conduits 30, 40 to the respective outlet ends 12, 22, whereupon each bottle is dispensed in the same upright orientation 30C on the conveyors 70, 71 for transfer to a further workstation or workstations, such as labeling, filling, capping, and/or packaging machines.

Those bottles 30" that are not drawn off the conveyor 40, for whatever reason, roll off of the conveyor belt 41 and into the return chute 48, whereupon these bottles are transferred to the receptacle 50. Once in the receptacle 50, the bottles are transferred via the feed chute 51 back to the hopper 60 by the positive air pressure generated by the blower 52. In this fashion, the bottles 30" that were not drawn off the conveyor 40 into either of the conduits 10, 20 are recycled through the descrambling apparatus as necessary until they are descrambled.

Without being limited to any particular theory of operation, it is believed that the selective movement of the randomly oriented articles to one of either of the oppositely arranged conduits by the suction created therein is the result of pressure differentials created by air moving over the asymmetric shape of articles, such as the illustrated bottles. In the illustrated example of the bottles, for instance, it is believed that the air flow is more rapid, and the suction in the conduit consequently greater, where the bottom of the bottle faces the conduit inlet, since the passageway for air entering the conduit in that region is smaller than the passageway for air entering the opposing conduit inlet. As a result, the bottles are consistently drawn bottom first into the inlet of the adjacent conduit.

It will of course be understood from the foregoing that the selective movement of randomly oriented articles into one or the other of two oppositely arranged conduits according to the phenomenon described is dependent in part not upon the type of article, but its shape. Consequently, it is envisioned that the present invention need not be limited to descrambling bottles, such as shown and described in this specification, but may instead be employed in the descrambling of an endless variety of asymmetrically-shaped articles, including numerous articles of manufacture, that can be selectively moved, depending upon their orientation, by sufficient suction.

Of course, the foregoing is merely illustrative of the present invention. Those of ordinary skill in the art will appreciate that many additions and modifications to the present invention, as set out in this disclosure, are possible without departing from the spirit and broader aspects of this invention as defined in the appended claims.

The invention in which an exclusive property or privilege is claimed is defined as follows:

1. An apparatus for positioning randomly oriented, asymmetrically-shaped articles in the same orientation, the apparatus comprising:
   at least first and second oppositely arranged conduits dimensioned to receive the articles therein, each conduit having an inlet end, and the inlet ends of the at least first and second conduits being spaced-apart to define an opening therebetween for receiving therein, one at a time, a plurality of asymmetrically-shaped articles that are randomly oriented in at least first and second orientations; and
   means for creating suction in both of the at least first and second conduits that is sufficient to selectively draw articles oriented in the first orientation from the opening into the inlet end of the at least first conduit, and that is sufficient to draw articles oriented in the second orientation from the opening into the inlet end of the at least second conduit, such that articles in the at least first and second conduits are all identically oriented relative to a path of travel through the conduits.

2. The apparatus of claim 1, wherein the at least first and second conduits are directly oppositely arranged.

3. The apparatus of claim 1, further comprising means for presenting at the opening between the inlet ends of the at least first and second conduits a plurality of asymmetrically-shaped articles that are randomly oriented in at least first and second orientations.

4. The apparatus of claim 1, further comprising means for receiving articles from the at least first and second conduits for transfer to at least one remote location.

5. The apparatus of claim 1, further comprising at least one conveyor arranged proximate an outlet end of each of the at least first and second conduits, each conveyor adapted to receive articles from one of the at least first and second conduits for transfer to at least one remote location.

6. An apparatus for positioning randomly oriented, asymmetrically-shaped articles in the same orientation, the apparatus comprising:

at least first and second conduits dimensioned to receive the articles therein, one at a time, each conduit having an inlet end, the inlet ends of the at least first and second conduits being arranged directly oppositely on a conveyor adapted to convey to an opening between the inlet ends of the at least first and second conduits a plurality of asymmetrically-shaped articles that are randomly, oppositely oriented in at least first and second orientations on the conveyor; and means for creating suction in both of the at least first and second conduits that is sufficient to draw articles oriented in the first orientation from the conveyor into the inlet end of the at least first conduit, and that is sufficient to draw articles oriented in the second orientation from the conveyor into the inlet end of the at least second conduit, such that articles in the at least first and second conduits are all identically oriented relative to a path of travel through the conduits.

7. The apparatus of claim 6, further comprising means for recycling through the conveyor articles not previously drawn into one of the at least first and second conduits.

8. The apparatus of claim 6, wherein the conveyor comprises first and second ends, the first end of the conveyor being adapted to receive thereon articles to be conveyed to the at least first and second conduits, and the second end of the conveyor being arranged downstream of the conduits, and the apparatus further comprises a return chute adapted to receive articles from the second end of the conveyor that are not drawn into one of the at least first and second conduits, a receptacle communicating with the return chute and dimensioned to receive therein articles from the return chute, a feed tube having a first end communicating with the receptacle and a second end positioned proximate the first end of the conveyor, and a blower adapted to generate a positive air pressure sufficient to convey through the feed tube any articles transferred to the receptacle via the return chute.

9. The apparatus of claim 6, further comprising means for receiving articles from the at least first and second conduits for transfer to at least one remote location.

10. The apparatus of claim 6, further comprising at least one conveyor arranged proximate an outlet end of each of the at least first and second conduits, each conveyor adapted to receive articles from one of the at least first and second conduits for transfer to at least one remote location.

11. A method for positioning randomly oriented, asymmetrically-shaped articles in the same orientation, comprising the steps of:

providing at least first and second oppositely arranged conduits dimensioned to receive the articles therein, each conduit having an inlet end, and the inlet ends of the at least first and second conduits being spaced-apart to define an opening between the conduit inlets for receiving therein, one at a time, a plurality of asymmetrically-shaped articles that are randomly oriented in at least first and second orientations;

presenting, one at a time, a plurality of asymmetrically-shaped articles that are randomly oriented in first and second orientations at the opening between the conduit inlets; and creating in both of the at least first and second conduits suction that is sufficient to selectively draw articles oriented in the first orientation from the opening into the inlet end of the at least first conduit, and sufficient to draw articles oriented in the second orientation from the opening into the inlet end of the at least second conduit, such that articles in the at least first and second conduits are all identically oriented relative to a path of travel through the conduits.

12. The method of claim 11, wherein the at least first and second conduits are directly oppositely arranged.

13. The method of claim 11, further comprising the step of transferring articles from the at least first and second conduits to at least one further location.

14. The method of claim 11, further comprising the step of recycling and subsequently presenting at the at least first and second conduits any of the plurality of articles not previously drawn into one of said at least first and second conduits.

15. A method for positioning randomly oriented, asymmetrically-shaped articles in the same orientation, comprising the steps of:

providing at least first and second directly oppositely arranged conduits dimensioned to receive the articles therein, each conduit having an inlet end, and the inlet ends of the at least first and second conduits being spaced-apart to define an opening between the conduit inlets for receiving, one at a time, a plurality of asymmetrically-shaped articles that are randomly oriented in at least first and second orientations;

conveying a plurality of asymmetrically-shaped articles that are randomly oriented in first and second orientations in a first direction of travel to the opening defined between the inlet ends of the conduits; and creating in both of the at least first and second conduits suction that is sufficient to selectively draw articles oriented in the first orientation from the opening into the inlet end of the at least first conduit, and sufficient to draw articles oriented in the second orientation from the opening into the inlet end of the at least second conduit, such that articles in the at least first and second conduits are all identically oriented relative to a path of travel through the conduits.

16. The method of claim 15, further comprising the step of transferring articles from the at least first and second conduits to at least one further location.

17. The method of claim 15, further comprising the step of recycling and subsequently presenting at the at least first and second conduits any of the plurality of articles not previously drawn into one of said at least first and second conduits.

* * * * *